US 8,122,800 B2

(12) United States Patent
Correa

(10) Patent No.: US 8,122,800 B2
(45) Date of Patent: Feb. 28, 2012

(54) CUTTING BOARD APPARATUS AND METHOD

(76) Inventor: Ramon Correa, Hudson, NY (US)

(*) Notice: Subject to any disclaimer, the term of this patent is extended or adjusted under 35 U.S.C. 154(b) by 37 days.

(21) Appl. No.: 11/832,347

(22) Filed: Aug. 1, 2007

(65) Prior Publication Data
US 2009/0033012 A1 Feb. 5, 2009

(51) Int. Cl.
B26D 7/06 (2006.01)
B26D 7/00 (2006.01)
B23Q 3/00 (2006.01)
A23N 4/04 (2006.01)
B65D 1/24 (2006.01)
B65D 25/04 (2006.01)

(52) U.S. Cl. ........... 83/130; 83/167; 269/302.1; 99/537; 220/507

(58) Field of Classification Search ............... 83/130, 83/167; 269/289 R, 302.1; 99/537–538; 220/522, 507
See application file for complete search history.

(56) References Cited

U.S. PATENT DOCUMENTS

| 933,180 | A | | 9/1909 | Johnson | |
|---|---|---|---|---|---|
| 1,224,838 | A | | 5/1917 | Blissman et al. | |
| 1,403,883 | A | * | 1/1922 | Woods | 269/13 |
| D143,516 | S | | 1/1946 | Whitlock | |
| 2,609,024 | A | | 9/1952 | Russ | |
| 2,866,556 | A | | 12/1958 | Hinz | |
| 2,954,875 | A | * | 10/1960 | Becker | 211/41.3 |
| 3,013,851 | A | * | 12/1961 | Maron | 312/140.4 |
| 4,480,343 | A | * | 11/1984 | Drach | 4/656 |
| 4,497,412 | A | * | 2/1985 | Labelle | 211/70.7 |
| D280,249 | S | | 8/1985 | Martin | |
| 4,596,329 | A | * | 6/1986 | Eldridge, Jr. | 206/370 |
| D288,375 | S | | 2/1987 | Okami | |
| D292,134 | S | | 9/1987 | McDaniel, Sr. | |
| 4,979,610 | A | * | 12/1990 | Thomas | 206/749 |
| D337,186 | S | | 7/1993 | Drach | |
| D365,182 | S | | 12/1995 | Zehrung | |
| 5,546,852 | A | * | 8/1996 | Bidwell | 99/446 |
| 5,865,105 | A | * | 2/1999 | Pepelanov | 99/446 |
| 6,302,273 | B1 | * | 10/2001 | Edmunds | 206/575 |
| 6,536,753 | B1 | | 3/2003 | Keener | |
| 6,626,303 | B1 | * | 9/2003 | Moodie | 211/70.7 |
| 6,644,639 | B1 | | 11/2003 | Newton | |
| 6,651,970 | B2 | * | 11/2003 | Scott | 269/289 R |

(Continued)

FOREIGN PATENT DOCUMENTS
JP 2006116256 * 11/1995
(Continued)

Primary Examiner — Ghassem Alie
Assistant Examiner — Bharat C Patel
(74) Attorney, Agent, or Firm — Schmeiser, Olsen & Watts, LLP

(57) ABSTRACT

Provided is a cutting board apparatus comprising a catch pan and a cutting platform. The catch pan includes a substantially planar upper surface enclosed by a retaining member. The catch pan further includes a base member on an underside of the catch pan stabilizing the catch pan against cutting forces. The cutting platform includes a substantially planar cutting surface elevated from the catch pan by a support member extending away from the face of the planar cutting surface, wherein the cutting platform is positioned on the catch pan to form a discard channel between the catch pan retaining member and the cutting surface's outer boundary, and further, wherein the cutting platform and the catch pan are rotatably attached to each other about an axis. Also provided is a corresponding method of cutting an item utilizing a cutting board apparatus.

8 Claims, 5 Drawing Sheets

U.S. PATENT DOCUMENTS

| | | |
|---|---|---|
| 6,722,644 B1 | 4/2004 | Prosser |
| 6,726,050 B1 | 4/2004 | Barentine et al. |
| D500,645 S | 1/2005 | Goggin |
| D500,940 S | 1/2005 | Goggin |
| 6,994,334 B2 * | 2/2006 | Jones et al. ............... 269/289 R |
| 6,994,336 B2 | 2/2006 | Loo |
| 7,077,392 B2 | 7/2006 | Siegel et al. |
| 2004/0119220 A1 | 6/2004 | Davis |
| 2005/0040580 A1 * | 2/2005 | Davis ........................ 269/289 R |

FOREIGN PATENT DOCUMENTS

JP  07289456 A  *  5/2006

* cited by examiner

CUTTING BOARD APPARATUS AND METHOD

BACKGROUND OF THE INVENTION

1. Technical Field

This invention relates generally to cutting food or other items. More particularly, this invention provides an apparatus and method which supports food or other items on a surface for cutting and accommodates liquid or solid by-products produced from cutting food or other items.

2. Related Art

When cutting or chopping an item, it is often desirable to have a surface on which to cut or chop against. Even the most basic cutting board satisfies this need. However, a problem commonly encountered, particularly when cutting food items, is the release of juices or other cutting by-products. Many cutting board designs do not address this problem at all. Among those that do, there is often inadequate means to accommodate the juices or other cutting by-products. Likewise, there is often no efficient way to discard the juice or other cutting by-products into a sink or other disposal area. Furthermore, with many cutting boards it is necessary to tip the entire cutting board in order to clear the cutting surface and make room for new items to cut. Tipping the entire cutting board may not be desirable because it usually means that captured juices or other cutting by-products must be properly disposed of at that time. This may be inconvenient, leading to inefficiency and wasted effort. Moreover, quick and easy access to a selection of knives is often desirable to enhance cutting efficiency. The present invention addresses these deficiencies.

SUMMARY OF THE INVENTION

A first aspect of the present invention is a cutting board apparatus comprising: a catch pan, having a substantially planar upper surface enclosed by a retaining member, the catch pan further including a base member on an underside of the catch pan stabilizing the catch pan against cutting forces; a cutting platform, having a substantially planar cutting surface elevated from the catch pan by a support member extending away from the face of the planar cutting surface; wherein the cutting platform is positioned on the catch pan to form a discard channel between the catch pan retaining member and the cutting surface's outer boundary; and further, wherein the cutting platform and the catch pan are rotatably attached to each other about an axis.

A second aspect of the present invention is a cutting board apparatus comprising: a cutting platform and a catch pan rotatably attached to each other, the catch pan having a substantially planar upper surface enclosed by a retaining member, the cutting platform having a substantially planar cutting surface elevated from the planar upper surface of the catch pan by a support member extending away from the face of the planar cutting surface of the cutting platform; wherein the cutting platform is positioned on the catch pan to form a discard channel between the catch pan retaining member and the cutting surface's outer boundary; and wherein the catch pan further includes a base member on an underside of the catch pan stabilizing the catch pan against cutting forces.

A third aspect of the present invention is a method for cutting comprising: providing a cutting board apparatus including: a catch pan, the catch pan having a retaining member enclosing the catch pan's upper surface, the retaining member having an opening with a lip, the catch pan further having a handgrip; and a cutting platform, the cutting platform having a cutting surface and further having a support member configured to elevate the cutting surface above the catch pan's upper surface, wherein the cutting platform is rotatably attached to the catch pan and is constrained such that when the cutting platform support is in contact with the catch pan upper surface, a discard channel is formed inside the retaining member and around the cutting platform; placing the cutting board apparatus on a support surface next to a sink, with the catch pan lip positioned to overhang the sink and with the catch pan in stable contact with the support surface; positioning the cutting platform to rest on the catch pan with the cutting platform support member in contact with the catch pan's upper surface; placing an item to be cut on the cutting surface; and cutting the item with a cutting tool.

BRIEF DESCRIPTION OF THE DRAWINGS

Some embodiments of this invention will be described in detail, with reference to the following figures, wherein like designations denote like members, wherein.

DETAILED DESCRIPTION OF THE INVENTION

Figure 1:
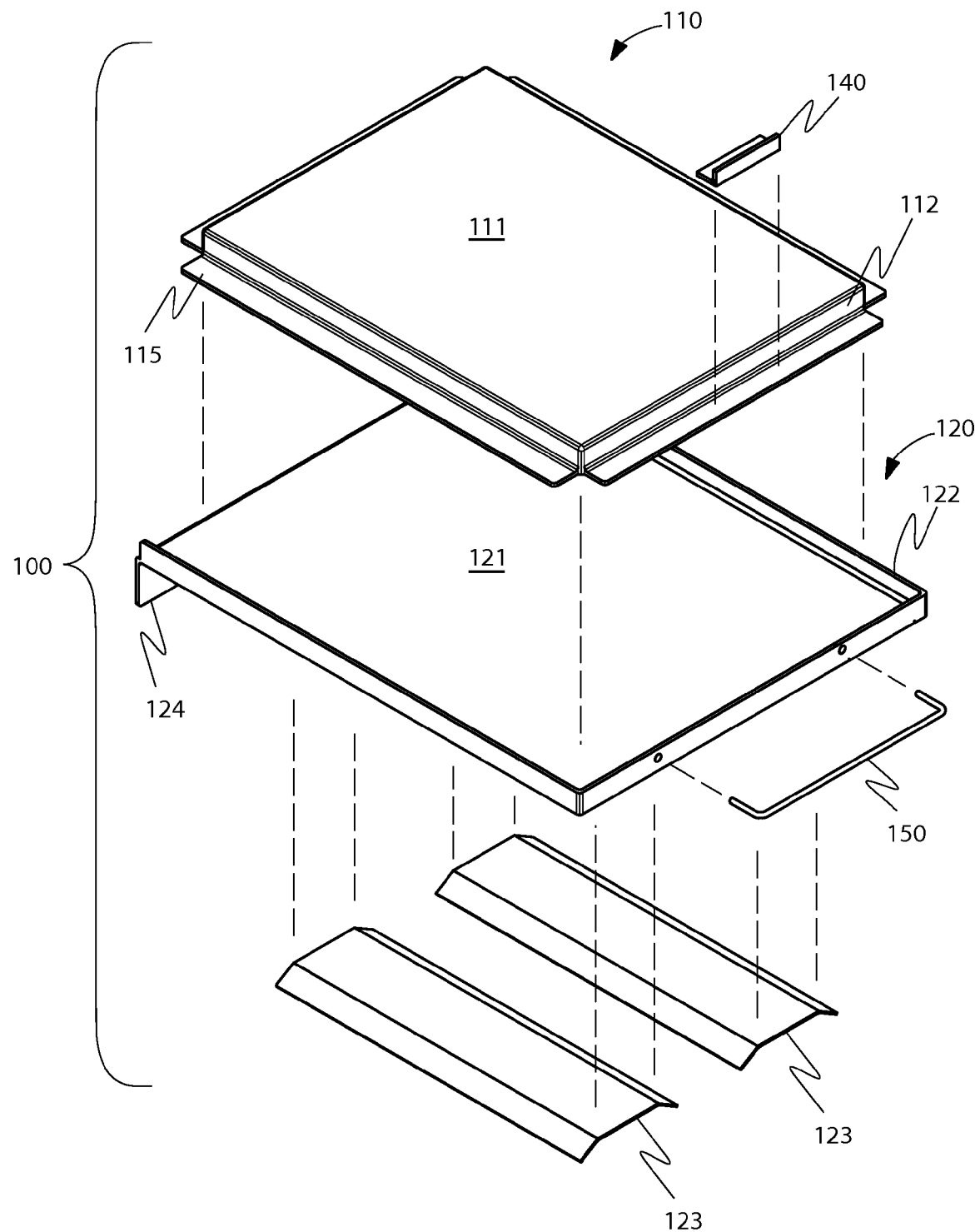
FIG. 1 is an exploded perspective view of an embodiment of a cutting board apparatus, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Figure 7:
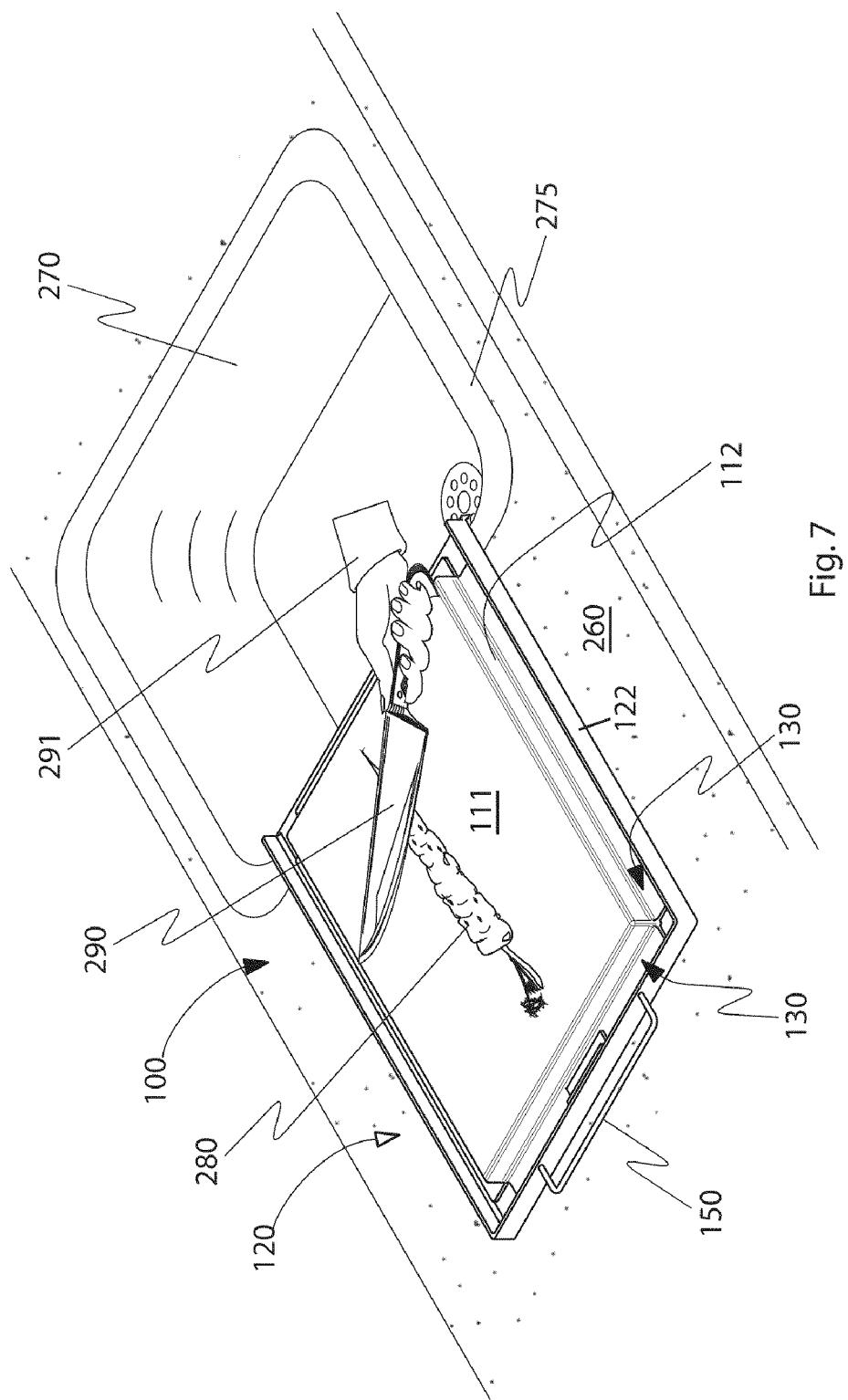
FIG. 7 is a perspective view of an embodiment of a cutting board illustrating a method of cutting.

Referring to the drawings, FIG. 1 depicts an exploded view of a cutting board apparatus 100 including a cutting platform 110 and a catch pan 120, in accordance with the present invention. A catch pan 120 may include a substantially planar upper surface 121. With reference to FIG. 7 and continued reference to FIG. 1, a planar upper surface 121 may support a cutting platform 110 under cutting forces. A planar upper surface 121 may have a profile of any shape including rectangle, square, circle, oval, or any other substantially two-dimensional outline. A planar upper surface 121 may be constructed of stainless steel, aluminum, wood, bamboo, polymer, plastic, acrylic, nylon, glass, composite, or any other like material capable of supporting a cutting platform and resisting cutting forces transferred through a cutting platform.

With further reference to FIGS. 1 and 7, a catch pan 120 may include a retaining member 122. When an item 280 is cut by a knife 290 or other cutting tool, various by-products of the cutting operation may deposit on a cutting platform 110. An item 280 to be cut may be a food item such as meat, vegetable, or fruit or any other like food products. A knife 290 or other cutting tool or implement may be operated by hand 291 or by machine. By-products from cutting may be solid, liquid, or a combination. Examples of cutting by-products are crumbs, bones, meat scraps, peels, and juices. By-products from cutting may drain or fall off of a cutting platform 110 naturally or they may be moved off. Once cutting by-products have vacated or been removed from a cutting platform 110, they may be captured by a catch pan. For example, juices from a cut fruit may drain or meat scraps may be brushed off of a cutting platform 110 and onto a catch pan 120. A retaining member 122 may serve to keep such juices or scraps on a catch pan 120. Accordingly, a retaining member 122 may create an enclosure on a planar upper surface 121. An enclosure created by a retaining member 122 may have a similar outline or profile as a planar upper surface 121. A retaining member 122 may provide a complete or partial enclosure on a planar upper surface 121. A retaining member 122 may be attached to, and extend away from, a catch pan 120 planar upper surface 121. A retaining member 122 may be an integral component of a catch pan 120 or it may be removably attachable or permanently affixed. A retaining member 122 may be suitable to retain liquids or solids produced by cutting an item. A retaining member 122 may be a wall or other barrier to liquids or solids. A retaining member 122 may be constructed of stainless steel, aluminum, wood, bamboo, plastic, acrylic, nylon, glass, composite, rubber, silicone, or any other material suitable for retaining juices or food scraps on a catch pan.

Figure 3:
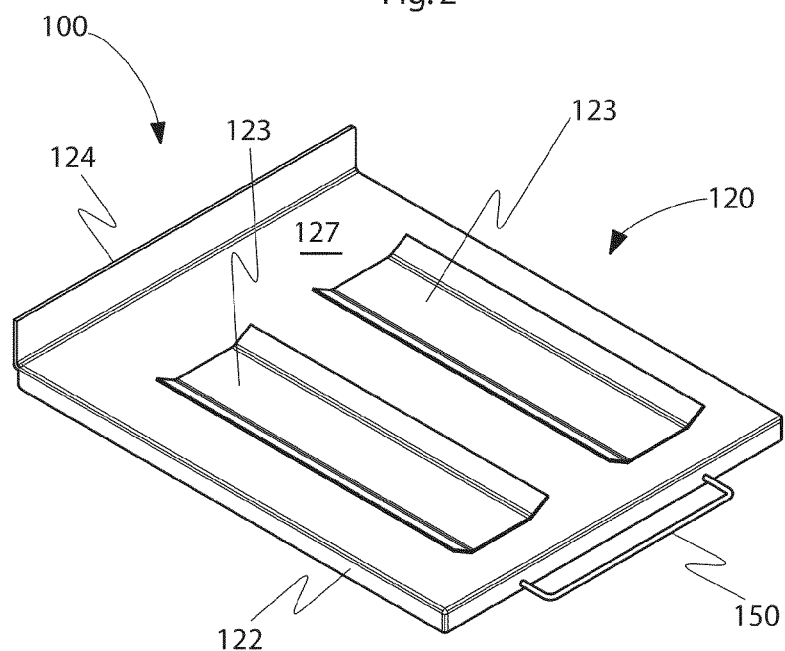
FIG. 3 is a bottom perspective view of an embodiment of a cutting board apparatus, in accordance with the present invention.

With reference to FIG. 3 and with continuing reference to FIGS. 1 and 7, a catch pan 120 may include a base member 123 on an underside 127 of the catch pan 120. A base member 123 may be configured to provide stable support for a cutting board apparatus 100 under cutting forces. A base member 123 may be configured to rest upon a supporting surface 260 such as a counter top, table top, work bench, or any other like surface that may support a cutting board apparatus 100. A base member 123 may include legs, feet, pads, a mat, rails, platforms, or any other means of providing stable support for a cutting board apparatus 100 under cutting forces. A base member 123 may be constructed of stainless steel, aluminum, wood, plastic, acrylic, nylon, glass, composite, rubber, silicone, cork, or any other like material that may support a cutting board apparatus 100 under cutting forces. A base member 123 may be an integral component of a catch pan 120 or it may be removably attachable or permanently affixed thereto.

Any surface of a base member 123 that may come in contact with a supporting surface 260 may include friction enhancing features to prevent a cutting board apparatus 100 from slipping on a supporting surface 260 under cutting forces. Friction enhancing features may include surface texturing such as ridges, grooves, dimples, bumps, depressions, pebbling, cross-hatching, or any other friction enhancing surface texture. Friction enhancing features may also include high friction materials such as low durometer rubber, silicone, cork, or any other high friction material. Friction enhancing features of any surface texture or material may be combined in any fashion. A base member 123 for a cutting board apparatus 100 may be configured to adhere to a flat surface by suctioning means. Suctioning means may be removably attachable, permanently affixed, or an integral component with a base member 123. Alternatively, a base member 123 may be configured to provide stable support for a cutting board apparatus 100 utilizing clamping means to affix to a suitable clamping location such as to a table, counter, or workbench. Clamping means may be removably attachable, permanently affixed, or an integral component of a base member 123.

Figure 6:
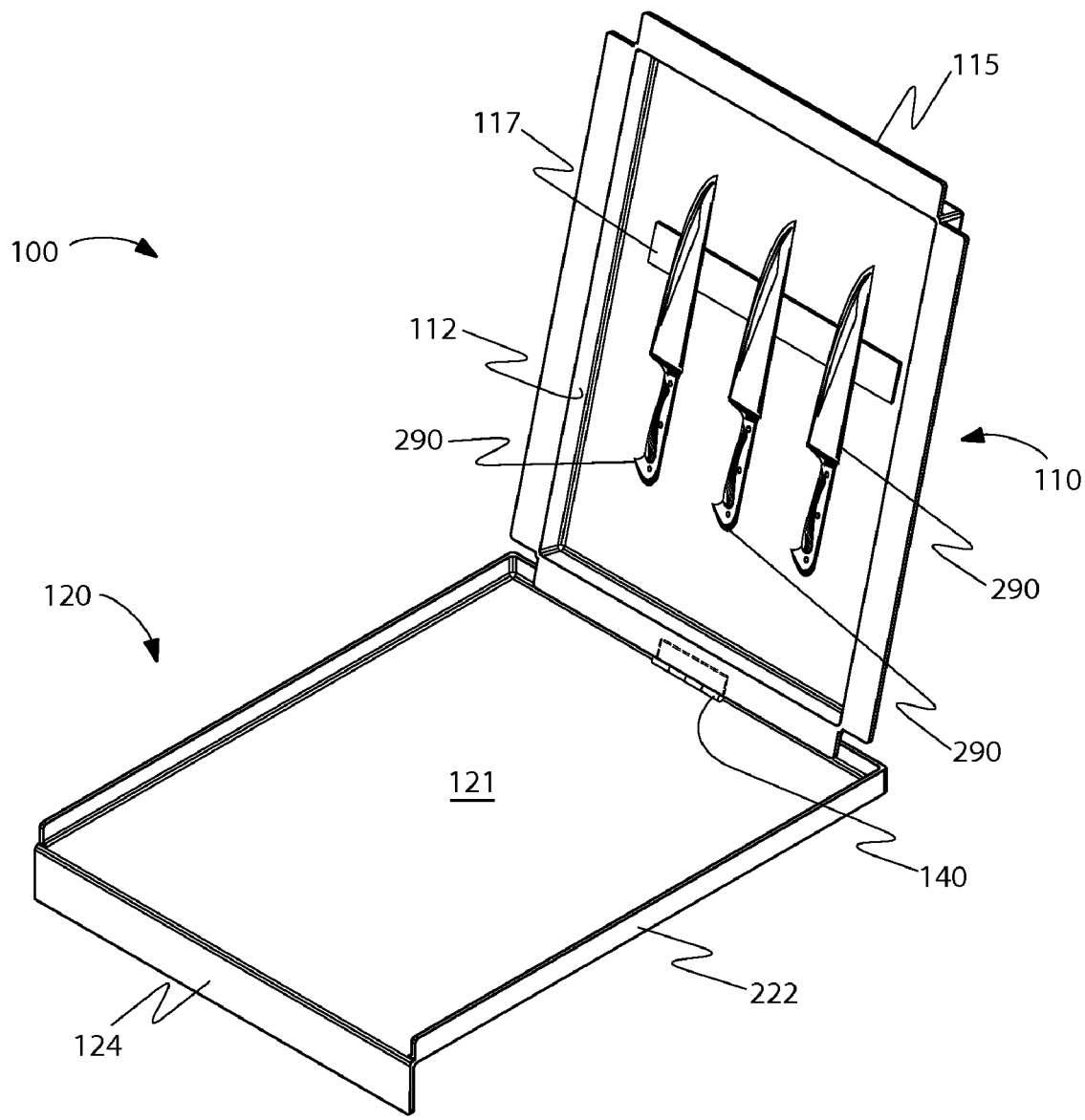
FIG. 6 is a perspective view of an embodiment of a cutting board apparatus, in accordance with the present invention.

With reference to FIG. 6 and still further reference to FIGS. 1, 3 and 7, a catch pan 120 may be configured such that a retaining member 122 is a partial enclosure of a planar surface 121. There may be a lip 124 at an opening of such a partial enclosure. A lip 124 may be configured to direct liquid or other cutting by-products away from a catch pan 120. A lip 124 may be an overhanging edge, projecting edge, rim, spout, border, brim, flange, flare, skirt, ledge, molding, terminus, or any other like means for allowing cutting by-products to drain from the catch pan 120. A catch pan 120 may be configured to drain liquid toward a lip 124, whereby liquids or other cutting by-products may then be directed out of a catch pan 120 by a lip 124. One embodiment of this is a base member 123 configured to angle a catch pan 120 such that liquid or other cutting by-products would drain toward a lip 124. Another embodiment is to configure a catch pan's 120 planar upper surface 121 such that liquid or other cutting by-products would drain toward a lip 124.

When a catch pan 120 includes a lip 124, as seen in an embodiment represented in FIGS. 3, 6, and 7, a cutting board apparatus 100 may be positioned next to a sink 270 to facilitate transfer of juices or other cutting by-products to a sink 270. Often a sink edge 275 is elevated above a supporting countertop surface 260 next to a sink 270. An elevated sink edge 275 may interfere with a catch pan 120 underside 127 or base member 123 resulting in juices or other cutting by-products being retained in a catch pan 120 instead of being drained over a lip 124 into a sink 270. Accordingly, a base member 123 may be configured to sit on a supporting surface 260 next to a sink 270 and provide clearance for both a catch pan 120 underside 127 and a lip 124 with a sink edge 275. This may be accomplished by providing vertical clearance for a catch pan 120 underside 127 with a sink edge 275 and also horizontal clearance for a sink edge 275 between a base member 123 and a lip 124.

Figure 5:
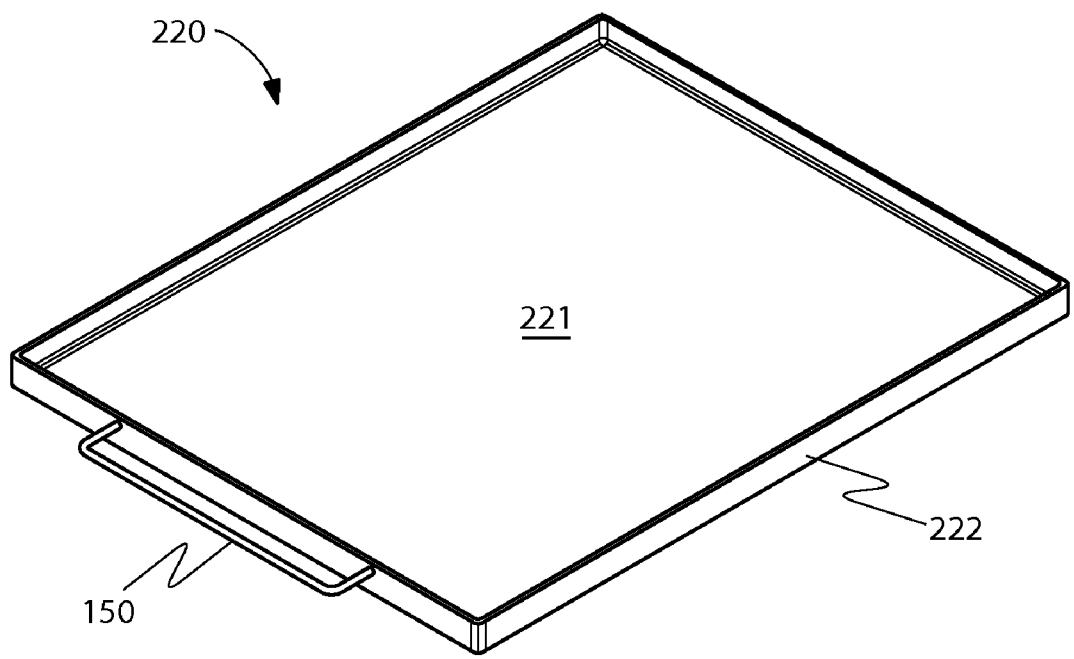
FIG. 5 is a perspective view of an embodiment of a catch pan, in accordance with the present invention.

However, as FIG. 5 illustrates, an embodiment of a catch pan 220 may not be configured to include a lip 124. In this embodiment, a retaining member 222 forms a complete enclosure around a catch pan's 220 planar upper surface 221. Here, it is not necessary to offset a base member 123 on a catch pan 220 since, without a lip 124, there is no need to provide clearance for a catch pan 220 underside with a sink 270 edge 275. This does not imply that a base member 123 may be offset on a catch pan 120, 220 only when necessary to provide clearance for a sink 270. A base member 123 may be offset or located anywhere on a catch pan 120, 220 for any reason.

With still further reference to FIGS. 1, 5, and 7, a catch pan 120 may incorporate a handgrip 150. A handgrip 150 may be removably attachable, permanently affixed or it may be formed as an integral part of a catch pan 120, 220 or a cutting platform 110. A handgrip 150 may include means for grasping such as handles, rings, loops, straps, grips, holds, knobs, stems, or any other means for grasping. A handgrip 150 may be rigid by incorporating rigid materials such as metal, wood, composite, or plastic, or it may be flexible by incorporating flexible natural or synthetic materials such as nylon or hemp fibers in rope form, or a flexible plastic or leather strap. A handgrip 150 may include a single handgrip or a plurality of handgrips and may be located anywhere on a catch pan 120, 220 or cutting platform 110, especially where convenient for grasping.

Figure 4:
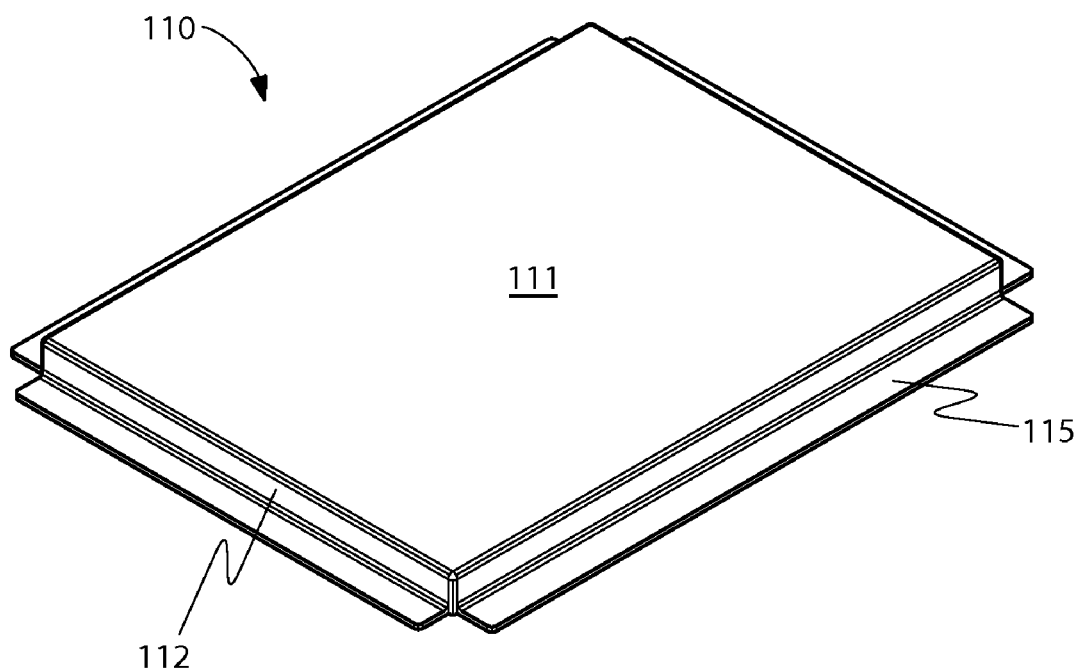
FIG. 4 is a perspective view of an embodiment of a cutting platform, in accordance with the present invention.

With reference to FIG. 4 and continued reference to FIGS. 1 and 7, a cutting platform 110 may include a substantially planar cutting surface 111. A planar cutting surface 111 provides an area on which to cut an item, such as item 280. A planar cutting surface 111 may have a profile of any shape including rectangle, square, circle, oval, or any other substantially two-dimensional outline. A profile of a planar cutting surface 111 may be similar to a profile of a catch pan 120, 220 to facilitate an interface between the components. A planar cutting surface 111 may be constructed of stainless steel, aluminum, wood, bamboo, plastic, acrylic, nylon, glass, composite, or any other rigid material. A planar cutting surface 111 may be textured, in whole or in part, to prevent an item 280 to be cut from slipping. Texturing may include ridges, grooves, dimples, bumps, spikes, depressions, pebbling, cross-hatching, stipple, or any other surface attribute to prevent an item 280 to be cut from slipping on a planar cutting surface 111. On the other hand, a planar cutting surface 111 may be smooth, in whole or in part, lacking any form of texturing or other attribute to prevent an item 280 to be cut from slipping.

With further reference to FIGS. 1, 4, 5, 6, and 7, a cutting platform 110 may include a support member 112. A support member 112 may extend away from a planar cutting surface 111. A support member 112 may provide elevation for a planar cutting surface 111 above a catch pan 120, 220 planar upper surface 121, 221 and a catch pan 120, 220 retaining member 122, 222. A cutting platform 110 support member 112 may position a planar cutting surface 111 to extend a distance beyond a catch pan 120, 220 retaining member 122, 222, such as by elevating the planar cutting surface 111 up above the edge of a retaining member 122, 222. The cutting surface 111 may be positioned a distance higher than the retaining member 122, 222. Providing such a distance may help maintain an area around a planar cutting surface 111 clear of obstructions from a catch pan's 120, 220 retaining member 122, 222 that might interfere with a knife 290 or other cutting tool. A support member 112 may be configured to provide stable support under cutting forces for a cutting platform 110 on a catch pan 120, 220. A support member 112 may be configured to rest upon a catch pan 120, 220 planar upper surface 121, 221. A support member may include legs, feet, pads, rails, beams, platforms, or any other means of providing stable support for a cutting platform 110 on a catch pan 120, 220 under cutting forces. A support member 112 may be constructed of stainless steel, aluminum, wood, plastic, acrylic, nylon, glass, composite, rubber or any other material of sufficient strength and stiffness to resist cutting forces. A support member 112 may be an integral component of a cutting platform 110 or it may be removably attachable or permanently affixed.

Referring further to FIGS. 1, 4, 5, 6, and 7, locating and positioning features 115 may be used to locate and position a cutting platform 110 on a catch pan 120, 220. A cutting platform 110 may incorporate locating and positioning features 115 alone or in conjunction with mating features on a catch pan 120, 220. Locating and positioning features 115 may be flanges, tabs, tongue and groove, pin and hole, projecting rim, protruding edge, collar, rib, border, brim, flare, or any other feature or combination of features configured to locate and position a cutting platform 110 on a catch pan 120, 220. The fit of locating and positioning features 115 may be loose and free floating or it may be a secure engagement such as that provided by a detent or an interference fit.

Figure 2:
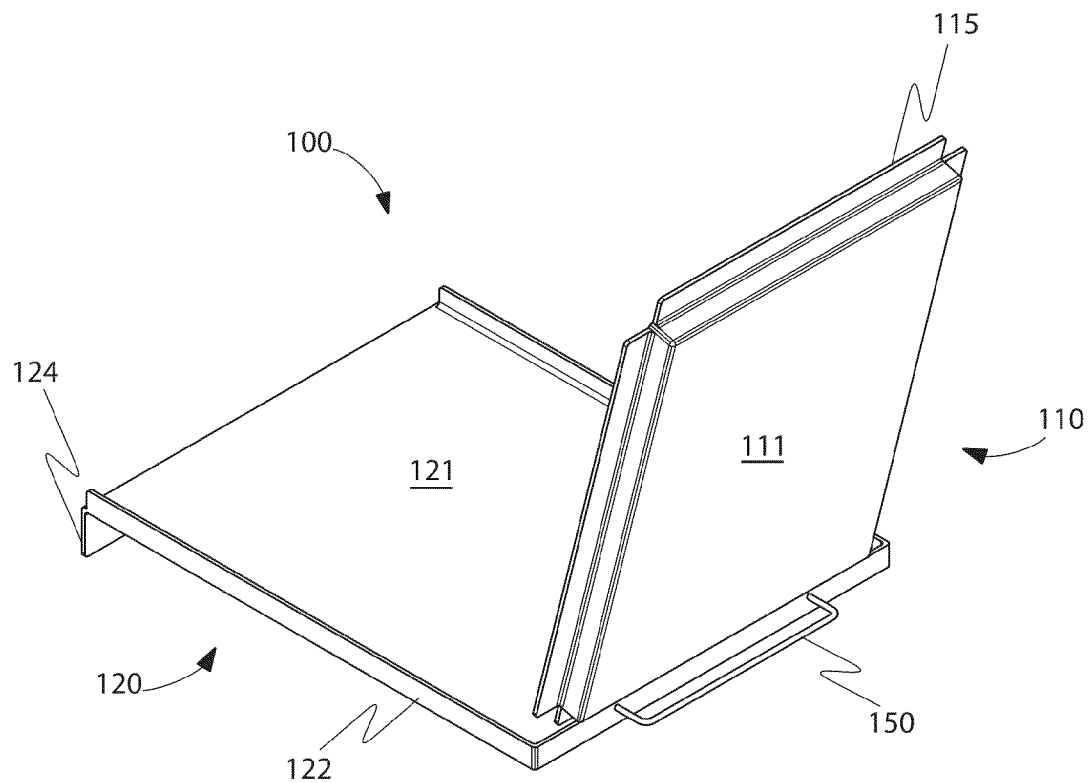
FIG. 2 is a top perspective view of an embodiment of a cutting board apparatus, in accordance with the present invention.

With reference to FIG. 2 and continued reference to FIG. 1, as an alternative to locating and positioning features 115 or as an addition to such features 115, a cutting platform 110 may be located and positioned on a catch pan 120, 220 by a rotatable attachment 140 to a catch pan 120, 220. A rotatable attachment 140 may be freely rotatable such as in a ball joint or it may be constrained to rotate about an axis such as in a hinge. A rotatable attachment 140 may be flexible, compliant, swiveling, swinging, bending, bowing, articulating, jointed, butt hinged, tee hinged, strap hinged, or any other like means of rotatable attachment. As an example, the embodiment in FIG. 2 has a rotatable attachment 140 of a hinge with an axis of rotation parallel to a catch pan's 120 planar upper surface 121. A rotatable attachment 140 may be located anywhere on a catch pan 120, 220 and a cutting platform 110 to permit rotation of a catch pan 120, 220 and a cutting platform 110. A rotatable attachment 140 may be an integral component of a catch pan 120, 220 or a cutting platform 110 or it may be an integral component of both a catch pan 120, 220 and a cutting platform 110 integrally joining the catch pan 120, 220 and cutting platform 110 together. A rotatable attachment 140 may be removably attachable or permanently in place. A rotatable attachment 140 may be constructed of steel, stainless steel, aluminum, brass, bronze, copper, zinc, nickel, glass, ceramic, polymer, plastic, acrylic, leather, rubber, or any other like material suitable for a rotatable attachment. A rotatable attachment 140 may be useful to maintain connection of a catch pan 120, 220 and a cutting platform 110 during transportation or storage while allowing access to the component parts for cleaning up. In use, a rotatable attachment 140 may allow for rapid and easy draining or clearing of a cutting surface 111 and catch pan 120, 220.

With reference to FIG. 7, regardless of the means of locating and positioning a cutting platform 110 on a catch pan 120, a discard channel 130 may exist between a retaining member 122 and around a cutting surface's 111 outer boundary. A discard channel 130 may be configured to accommodate by-products from cutting including solids or liquids. For example, juices from a cut fruit that has drained or meat scraps that have been brushed off of a cutting platform 110 and onto a catch pan 120, 220. A discard channel 130 may be configured to direct liquid or other cutting by-products toward a catch pan lip 124. A discard channel 130 may include a conduit, trench, duct, outlet, gutter, culvert, furrow, gully, trough, groove, or any other like means for retaining and/or channeling discarded cutting by-products.

With reference to FIG. 6, a cutting tool 290 may be secured to a cutting platform 110 by cutting tool securing means 117 such as a magnet, tray, knife block, sheath, roll, case, scabbard, clamp, receptacle, bin, drawer, strap, holder, bag, molding, elastic, or any other means for securing a cutting tool 290 to a cutting platform 110. Securing a cutting tool 290 to a cutting board apparatus 100 provides for convenient and efficient storage of a cutting tool 290 and affords ready access to a cutting tool 290 when needed.

A method of cutting is now described with reference to FIGS. 1-4, 6, and 7. One methodological step of cutting may be to provide a cutting board apparatus 100. The provided cutting board apparatus 100 may comprise a catch pan 120. The catch pan 120 may include a retaining member 122 enclosing a catch pan's upper surface 121. The retaining member 122 may have an opening with a lip 124. Moreover, the provided cutting board apparatus 100 may also comprise a cutting platform 110. The cutting platform 110 may include a planar cutting surface 111. The cutting platform 110 may further include a support member 112 configured to elevate the planar cutting surface 111 above the catch pan's upper surface 121. The cutting platform 110 may be movably attached to the catch pan 120 via a rotatable attachment 140 and may be constrained such that when the cutting platform 110 support member 112 is in contact with the catch pan's 120 upper surface 121, a discard channel 130 may be formed inside the retaining member 122 and around the cutting platform 110.

An additional methodological step of cutting may be placing a cutting board apparatus 100 on a supporting surface 260 next to a sink 270, with the catch pan lip 124 positioned to extend over the sink edge 275 and overhang the sink 270 and with the catch pan base member 123 in stable contact with the supporting surface 260. Still further, another methodological step of cutting may be positioning a cutting platform 110 to rest on a catch pan 120 with a cutting platform support member 112 in contact with a catch pan's upper surface 121. Another methodological step of cutting may be placing an item 280 to be cut on the planar cutting surface 111. Yet another methodological step of cutting may be cutting the item 280 with a knife 290 or other cutting implement or tool. An additional methodological step of cutting may be removing items that have been cut from the cutting platform 110 planar cutting surface 111. Still further, another methodological step of cutting may be lifting a handgrip 140 to drain cutting by-products from a catch pan 120 and cutting platform 110. Moreover, further methodology may include storing a cutting tool 290 on an underside of a cutting platform 110.

A cutting board apparatus 100 and its various features and components may be constructed in one or several pieces, in a single material or in a combination of materials.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

I claim:

1. A cutting board apparatus comprising:
   a catch pan, having a substantially planar upper surface composed of stainless steel, the substantially planar upper surface partially enclosed by a retaining member, wherein the retaining member is a wall extending upward from the substantially planar surface of the catch pan so as to form a partial enclosure created by the retaining member, the partial enclosure having a similar outline and profile as the planar upper surface, the catch pan further including a base member securely attached to an underside of the catch pan, the base member stabilizing the catch pan against cutting forces and being configured to sit on a supporting surface next to a sink and provide clearance for both the underside of the catch pan and the underside of a lip extending from an opening of the retaining wall member, so that the lip is positioned to extend into a sink, when the catch pan is positioned next to the sink, without any portion of the lip or the underside of the catch pan touching the sink;
   a handgrip attached to an outer surface of the catch pan and located to extend co-planar to the upper surface of the catch pan; and
   a cutting platform, having a substantially planar cutting surface composed of stainless steel, the substantially planar cutting surface elevated from the catch pan by a support member extending away from the face of the planar cutting surface, wherein the support member operates with a positioning feature that helps to locate and position the cutting surface with respect to the catch pan, wherein the support member is a wall extending downward from the substantially planar cutting surface so as to elevate and locate the substantially planar cutting surface above the entirety of the catch pan including the retaining member wall of the catch pan, wherein the positioning feature of the cutting platform is a flange surrounding a substantial portion of the support member wall and also extending substantially perpendicularly from the support member wall of the cutting platform, which positioning flange feature works in conjunction with the support member wall of the catch pan to locate and position the substantially planar cutting surface with respect to the catch pan;
   wherein the cutting platform is positioned on the catch pan in a first position to form a discard channel between the catch pan retaining member and the cutting surface's outer boundary, wherein the positioning flange feature resides flat against the bottom of the discard channel, positioning the support member wall of the cutting surface away from the retaining member of the catch pan; and
   further, wherein the cutting platform and the catch pan are rotatably attached to each other about an axis, so that the cutting platform may obtain a location in a second position, where the positioning flange feature is not located at the bottom of any discard channel formed between the retaining wall member of the catch pan and the support wall member of the cutting platform;
   wherein the cutting platform is configured to secure a plurality of cutting tools on an underside of the planar cutting surface.

2. The cutting board apparatus of claim 1 wherein the plurality of cutting tools are securable by a magnet.

3. The cutting board apparatus of claim 1 wherein a handgrip is attached to an outer surface of the catch pan.

4. The cutting board apparatus of claim 1 wherein apart from the stainless steel cutting surface of the cutting platform and the stainless steel upper surface of the catch pan, the other component features of the cutting board apparatus are constructed of a material selected from the group consisting of, plastic, glass, wood, composite, and combinations thereof that can support cutting forces.

5. A cutting board apparatus comprising:
   a cutting platform and a catch pan rotatably attached to each other, the catch pan having a substantially planar upper surface partially enclosed by a retaining member, wherein the retaining member is a wall extending upward from the substantially planar surface of the catch pan so as to form a partial enclosure created by the retaining member, the partial enclosure having a similar outline and profile as the planar upper surface, the cutting platform having a substantially planar cutting surface elevated from the planar upper surface of the catch pan by a support member extending away from the face of the planar cutting surface of the cutting platform; and
   a handgrip, attached substantially co-planar to the catch pan;
   wherein the cutting surface and the catch pan are composed of stainless steel;
   wherein a positioning feature operable with the support member of the cutting platform helps to position the cutting platform on the catch pan to form a discard channel between the catch pan retaining member and the cutting surface's outer boundary, wherein a positioning feature of the cutting platform operable with the support member of the cutting platform helps to position the cutting platform on the catch pan to form a discard channel between the catch pan retaining member and the cutting surface's outer boundary, which positioning feature works in conjunction with the support member of the cutting platform to locate and position the substantially planar cutting surface with respect to the catch pan; and wherein the catch pan further includes a base member securely attached to an underside of the catch pan, the base member stabilizing the catch pan against cutting forces and being configured to sit on a supporting surface next to a sink and provide clearance for both the underside of the catch pan and the underside of a lip extending from an opening of the retaining wall member, so that the lip is positioned to extend into a sink, when the catch pan is positioned next to the sink, without any portion of the lip or the underside of the catch pan touching the sink; and the cutting platform is configured to secure a plurality of cutting tools on an underside of the planar cutting surface.

6. The cutting board apparatus of claim 5 wherein the, wherein a discard channel directs cutting by-products onto said lip extending from the opening.

7. The cutting board apparatus of claim 6 wherein the cutting tools are secured by a magnet.

8. The cutting board apparatus of claim 5 wherein the apparatus is constructed substantially of metal in one unitary structure.

* * * * *